July 16, 1946. C. W. GINTER 2,404,052
LUBRICATION COUPLER
Filed April 26, 1944
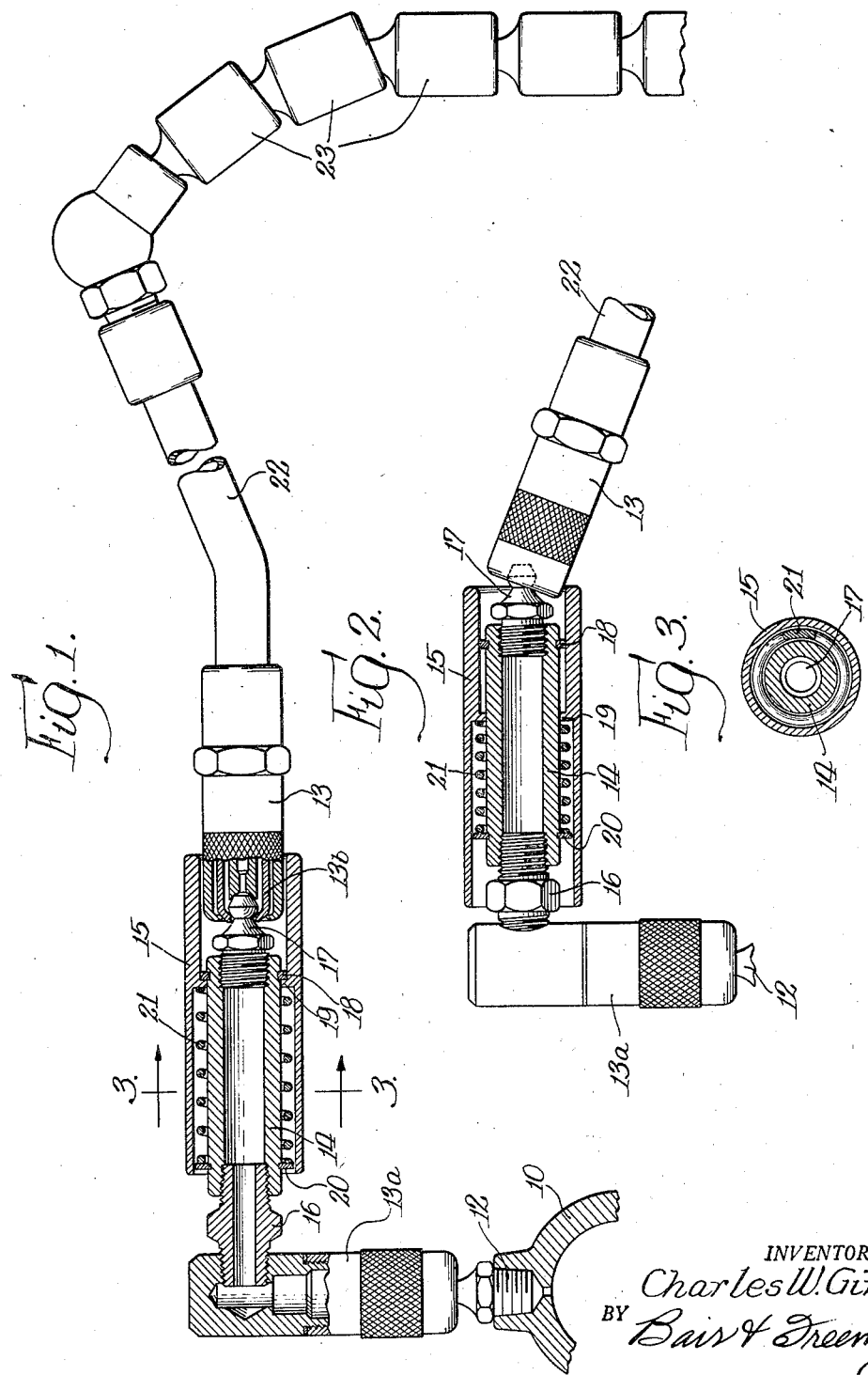
INVENTOR.
Charles W. Ginter,
BY Bair & Freeman
Atty's Patented July 16, 1946

2,404,052

UNITED STATES PATENT OFFICE 2,404,052

LUBRICATION COUPLER

Charles W. Ginter, Bryan, Ohio, assignor to The Aro Equipment Corporation, Bryan, Ohio, a corporation of Ohio Application April 26, 1944, Serial No. 532,741

1 Claim. (Cl. 285—169)

My present invention relates to a coupler particularly adapted for coaction with a jaw coupler of the kind that becomes disconnected from a lubricant reception fitting when swung to an angular position relative thereto.

One object of the invention is to provide such a coupler with a sleeve that slides over the jaw coupler to prevent it from moving to such angular position during lubricating operations.

Another object is to provide a spring means to automatically extend the sleeve to a position surrounding the jaw coupler so as to retain it in alignment with my coupler.

Still another object is to provide the sleeve slidably mounted so that it can be manually retracted against the action of the spring to a position where it does not surround the jaw coupler and thereby permits the jaw coupler to be disconnected by swinging it to a non-aligned position.

With these and other objects in view, my invention consists in the construction, arrangement and combination of the various parts of my device whereby the objects contemplated are attained, as hereinafter more fully set forth, pointed out in my claims and illustrated in the accompanying drawing, wherein:

Fig. 1 is a sectional view through a coupler embodying my present invention, showing it connected with a lubricant reception fitting of a bearing at one end and showing a jaw coupler connected to it at the other end.

Fig. 2 is a similar sectional view showing my coupler adjusted to a position for permitting disconnection of a jaw coupler; and Fig. 3 is a sectional view on the line 3—3 of Fig. 1.

On the accompanying drawing, I have used the reference numeral 10 to indicate a bearing into which the usual headed lubricant reception fitting is screwed. At 13 a jaw coupler is shown of the kind for instance in Neilson Patent No. 2,263,850, and this coupler ordinarily has its jaw end connected with the lubricant reception fitting 12. In some instances, however, the fitting 12 is not so positioned as to permit the jaw coupler 13 to coact therewith and an intermediate coupler is necessary.

My present invention contemplates such an intermediate coupler and includes as its essential parts a tube 14, a sleeve 15, a nipple 16 and a coupler 13a. The coupler 13a is a jaw coupler of the same type shown at 13 and the nipple 16 serves merely as a connection between 14 and 13a. A lubricant reception fitting 17 is screwed into the tube 14 for coaction of the jaws 13b of the coupler 13 therewith and the sleeve 15 is of such size as to readily slide over the coupler 12 as shown in Fig. 1.

The tube 14 has a ring-like stop flange 18 for coaction with a stop flange 19 of the sleeve 15. Another ring-like flange 20 is provided on the sleeve 14 adjacent the left hand end thereof. A spring 21 is interposed between the flanges 19 and 20 and biasing the sleeve 15 to slide to the position of Fig. 1 with the flange 19 engaging the flange 18. The inner diameter of the flange 19 and the periphery of the flange 20 serve to guide the sleeve 15 in its sliding movement. As illustrated on the drawing, the coupler 13 may be connected with a lubricant line such as a pipe 22 and a flexible metal hose 23 through which lubricant under high pressure is supplied to the coupler 13.

It will be readily understood that the sleeve 15 is freely slidable on the tube 14 with minimum friction on account of the fact that the stop flanges 18 and 20 on the tube 14 adjacent each end and the movement limiting flange 19 on the sleeve form bearings which space the sleeve from the tube and maintain the sleeve and tube in concentric relation. Further the bore in the rear end of the sleeve is enlarged so that it houses the coil spring 21 which normally maintains the sleeve in extended position, the flange on the rear end of the tube being of a larger size to snugly be received in the enlarged bore of the sleeve.

*Practical operation*

In the operation of my coupler, the jaw coupler 13 may be positioned on the headed fitting 17 while the sleeve 15 is in the position of Fig. 1 or, if the sleeve is in the way, it can be manually pushed back to the position of Fig. 2 during the connecting operation. The sleeve 15, if it has been pushed back, will automatically assume the position of Fig. 1 when it is released providing the jaw coupler 13 is aligned with the sleeve. Thereafter the jaw coupler cannot swing as to the position of Fig. 2 during the lubricating operation. When it is swung to the position of Fig. 2, the jaws disengage the ball head of the fitting 17 and for that reason it is necessary to keep 13 aligned with 14 for proper connection of the parts while lubrication is in process. The operator usually needs both hands for the lubricating operation and cannot hold the jaw coupler 13 in alignment and therefore the sleeve 15 accomplishes this desirable purpose. The operator is then free to operate a lever gun or other lubricating device supplying lubricant to the hose 23.

After the lubricating operation the sleeve 15 may be pushed to the position of Fig. 2 and thus permit the jaw coupler 13 to be swung sidewise or out of alignment with the tube 14 for disconnecting it from the fitting 17. The coupler 13a—14—15 may then be disconnected from the fitting 12.

Some changes may be made in the construction and arrangement of the parts of my coupler without departing from the real spirit and purpose of my invention, and it is my intention to cover by my claims any modified forms of structure or use of mechanical equivalents which may be reasonably included within their scope without sacrificing any of the advantages thereof.

I claim as my invention:

A coupler for high pressure lubricant lines comprising a tube terminating in a headed fitting with which a jaw coupler is adapted to be engaged when in alignment therewith, and disengaged by swinging it into position out of alignment therewith, a sleeve on said tube slidable between retracted and extended positions, a stop flange on said tube adjacent each end, a movement limiting flange on the sleeve between the stop flanges on the tube, the rear end of the sleeve having a larger bore than the forward end of the sleeve and the flanges on the tube having external diameters corresponding to the portions of the sleeve in which they are located and forming bearings serving to space the sleeve from the tube and maintain the tube and sleeve in concentric relation, the flange on the sleeve likewise assisting the spacing of the sleeve from the tube and serving as a bearing between the sleeve and tube, and a coil spring confined in the enlarged bore of the sleeve about the tube and between the flange on the tube and that of the sleeve and normally maintaining the sleeve in extended position.

CHARLES W. GINTER.